April 15, 1941.                T. C. EDSON                    2,238,042
                          PRINTER'S SET-UP CLIP
                          Filed April 23, 1940

INVENTOR.
                                               THEODORE C. EDSON
                                         BY
                                                      ATTORNEY.

Patented Apr. 15, 1941

2,238,042

UNITED STATES PATENT OFFICE 2,238,042

PRINTER'S SET-UP CLIP

Theodore C. Edson, Orinda, Calif.

Application April 23, 1940, Serial No. 331,133

7 Claims. (Cl. 101—404)

This invention relates to devices for temporarily holding printer's type set-ups together before locking them up in a chase, and the object of the invention is to effect important improvements in that form of spring wire type set-up holding clip shown in U. S. Patents 807,424 and 1,935,668 whereby accidental displacement will be prevented when the type forms are being run on the press.

In the drawing accompanying the application:

Figure 4:
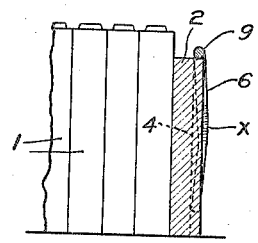
Figure 4 is a vertical cross section of Figure 3 taken along the line 4—4 of Figure 3, showing one leg of my improved spring wire clip in the groove of the lead, before locking in the chase.

Before describing the invention in detail it may be stated that the wire clips as purposed in the prior patents mentioned have legs which are projected into the holes of the leads of Patent 807,424, or the grooves of Patent 1,935,668, but while the legs of the clip of this latter patent, as shown in Figure 4 slant inwardly toward their outer ends, they are each nevertheless straight so that when sprung into the grooves they lie straight in the grooves, and since the grooves are sawed into the leads with a circular saw, they vary in depth from time to time as the saws are sharpened, or adjusted so that they must always be made deep enough to clear the thickness of the wire so that when metal furniture is used in locking the type up in a chase the wire clip legs will not be thicker than the depth of the groove, otherwise the chase could not be properly locked up as the furniture could not come flat against the leads. Hence when locked up the prior type of clips tend to work upward on high speed presses, especially if weakened or spread unduly through excessive use, and it is to prevent the possibility of the clips working up and sticking to the ink roller or be dropped onto the type faces to wreck the whole form and/or cut the rollers, that my improvement was made.

The principal improvement consists particularly of bending both legs of the clip at an intermediate point in their length in a direction so that when the clip is in place at the corner of a type set-up page with the legs of the clip in position in the vertical grooves of the lead, the central portion of the legs will be arched or kinked outwardly from the grooves beyond the outer faces of the leads, so that when locked up in a chase with the furniture the pressure of the latter and/or adjacent pages of type matter will flatten the arched portions of the legs back into the grooves, to thus put the legs under tension between the leads and the furniture. A further feature is to form small teeth or roughened points on the legs, so that the teeth or points will get a slight grip on the printer's furniture to prevent any possibility of displacement of the clip from the position shown in Figure 3, after being locked in the chase.

This may seem a trivial change over the prior clips shown in the art, but since the prior clips have never come into use insofar as can be learned, yet applicant's clips have proven their superiority at the University Press, Berkeley, California, in being absolutely safe under all high speed work, it is thought that the novel features described overcome the last bar to their universal adoption in the printing art, as there was always the danger with the prior style clip that it would work out during use and cause havoc, and printers would not trust it.

Figure 3:
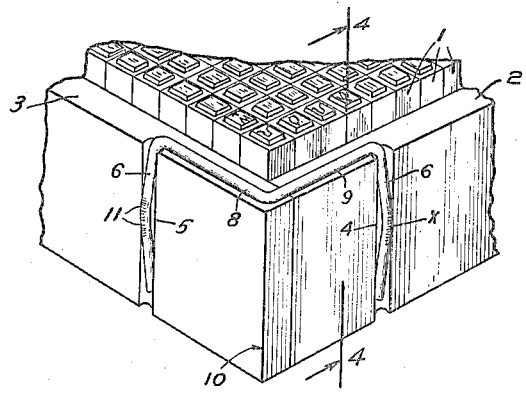
Figure 3 is a perspective view of the clip sprung in place in vertical grooves in the leads surrounding a type set-up.
Figure 1:
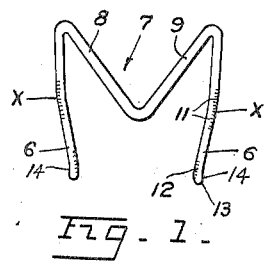
Figure 1 is a perspective view of my improved hard spring wire clip shown enlarged to about twice normal size.
Figure 2:
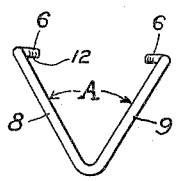
Figure 2 is a plan view of the clip.

In the drawing the assembled type are indicated at 1, the enclosing leads, 2 and 3, vertically grooved exteriorly at 4 and 5 to receive the kinked legs 6 of the spring wire clip 7 when the clip is forcibly sprung open from the less than right angle form shown in Figures 1 and 2 to the form shown in Figure 3 wherein the two horizontally disposed corner bights 8, 9, of the clip are substantially lying against the upper edges of the leads 2 and 3 and are sprung open to about form a right angle. It is understood that the grooves 4 and 5 are both spaced equally distant from the corner 10 of the leads so that the clips may be symmetrical, though it is evident that if the saw grooves 4 and 5 were themselves spaced equidistant from the ends of their respective leads, the additional thickness of lead 3 overlapping the end of lead 2 would require that bight 9 would have to be larger than bight 8 equal to the extra thickness of lead 3.

The most important feature constituting the invention is that while the two legs converge somewhat toward their free ends as shown in Fig. 1 so as to tend to press the lower portions of the leads together, and this action is largely contributed to by the original angle A between upper runs 8 and 9 of the wire being less than a right angle, there is an extra bend or outward kink formed in each leg at X so that when the clip is sprung into the vertical groove of the leads as shown in Fig. 3, the kinked legs 6 will bulge or hump out of the grooves somewhat as shown in Fig. 3 and still more clearly in Fig. 4. With this construction it will be evident that when such an assemblage is locked up in a chase against other leads or metal furniture, the contact will first be against these slightly projecting or humped portions X of the legs and that as the form is locked these humped legs being of tempered spring wire will be resiliently forced down into grooves but will always react outward against the furniture or outer leads with such force that they will never be free to work up and out of the grooves as the plain straight legs of the prior clips will do.

It will also be evident that with this formation of the legs the exact depth of the grooves is not important as long as they are deep enough to receive the diameter of the legs, though if somewhat deeper it does not matter as the spring hump portion X will always bear outwardly with a firm pressure against the surrounding furniture or walls of the chase.

As a still further precaution against the remotest possibility of the clips working out, I preferably stamp a series of slight transverse ridges on the bluged portion of the clips as at 11, and preferably also at the inner sides of the extreme ends of the legs at 12 where they bear against the bottom of the grooves, as this gives a positive gripping of the opposing pressure surfaces when the forms are locked in the chase. Instead of definite ridges any other form of roughened gripping surface may be used at the points indicated, or if desired the entire wire may be so ribbed or roughened, or any part of it before or after forming the clip. Also, wood or composition strips may be used instead of leads.

Another detail of importance is that since the spring wire is very hard it generally has extremely sharp edges at the ends where it was cut or sheared off, and which tend to dig into the soft metal of the grooves when the clips are pushed downward into place. I therefore preferably round off these extreme corners as indicated at 13 in Fig. 1, and/or I additionally bend the extreme tips of the wire legs 6 slightly outward as indicated at 14 in Fig. 1 in a direction away from the surface of the groove into which the corner of the wire would otherwise tend to dig.

It should also be noted that while I show my improved clip as made of hard round spring wire, it may be made of spring wire of any desired cross section, and that if made of square spring tempered wire it will have greater strength than a round wire fitting in the same size groove.

While the use of the spring clip is primarily to hold the type set up in place until locked up in the chase, as well as in the stored set-ups of pages for future editions, it is most important that the clips all stay in place during the printing, so that none will work out during printing to wreck the form, or worse, and also so that the various pages comprising the form may be taken out intact after printing, or to make any changes.

Having thus described my invention what I claim is:

1. A device for holding the vertically outwardly grooved corners of printer's type set-ups together preparatory to locking in a chase, comprising a spring wire clip having a pair of bights extending at less than a right angle from one another, and a leg at the end of each bight extending substantially at right angles to the plane of said bights, and each leg formed with a bend to cause a portion of the legs to project outward from the type form when in place in said grooved corners before locking up in a chase, whereby it will be compressed into the grooves in locking up.

2. A device for holding the vertically outwardly grooved corners of printer's type set-ups together preparatory to locking in a chase, comprising a spring wire clip having a pair of bights extending at less than a right angle from one another, and a leg at the end of each bight extending generally at right angles to the plane of said bights, and each leg formed with a bend intermediate its length to cause the legs to bulge outward from the type form when in place before locking up in a chase, whereby it will be compressed at said bend in locking up.

3. In a wire type set-up holding clip as described in claim 1, said legs formed with roughened gripping surfaces.

4. In a wire type set-up holding clip as described in claim 1, said legs formed with roughened gripping surfaces at points of pressure set up when locked in a chase.

5. In a wire type set-up holding clip as described in claim 1, the extreme ends of said legs having rounded edges.

6. A device for holding printer's type set-ups, comprising a spring wire clip having a pair of arms adapted to extend in opposite directions from the corner along the upper edges of the leads which enclose the type, each arm provided at its end with a downwardly extending leg adapted to fit within a groove formed in the outersides of the lead, the legs formed with a bend or kink projecting outwardly from the grooves respectively beyond the outer face of the leads when the clip is in position before locking up in a chase, so that upon locking up the type in a chase, the legs will be resiliently forced into said grooves.

7. In a wire clip as described in claim 6 the extreme ends of said legs being bent to extend slightly away from the adjacent wall of the groove in which it fits.

THEODORE C. EDSON.